(12) United States Patent
Zhou et al.

(10) Patent No.: US 10,862,573 B2
(45) Date of Patent: Dec. 8, 2020

(54) ANTENNA POLARIZATION PATTERNS

(71) Applicant: Hewlett Packard Enterprise Development LP, Houston, TX (US)

(72) Inventors: Qiang Zhou, Beijing (CN); Ben Dunsbergen, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/490,936

(22) PCT Filed: Mar. 7, 2017

(86) PCT No.: PCT/CN2017/075841
§ 371 (c)(1),
(2) Date: Sep. 4, 2019

(87) PCT Pub. No.: WO2018/161243
PCT Pub. Date: Sep. 13, 2018

(65) Prior Publication Data
US 2020/0014456 A1 Jan. 9, 2020

(51) Int. Cl.
*H04B 7/10* (2017.01)
*H04B 7/0413* (2017.01)
*H04B 7/06* (2006.01)

(52) U.S. Cl.
CPC .............. *H04B 7/10* (2013.01); *H04B 7/0413* (2013.01); *H04B 7/063* (2013.01)

(58) Field of Classification Search
CPC ....................................................... H04B 7/10
(Continued)

(56) References Cited

U.S. PATENT DOCUMENTS 6,690,934 B1 * 2/2004 Conrad, Jr. ........ H04B 7/18519
342/357.31
8,140,024 B2 3/2012 Prasad et al.
(Continued)

FOREIGN PATENT DOCUMENTS

CN 101459457 6/2009
CN 103812545 5/2014
(Continued)

OTHER PUBLICATIONS

Bahceci, I. et al.; "Efficient Channel Estimation for Reconfigurable Mimo Antennas: Training Techniques and Performance Analysis"; Nov. 8, 2016; 2 pages.
(Continued)

*Primary Examiner* — Lihong Yu
(74) *Attorney, Agent, or Firm* — Brooks, Cameron & Huebsch, PLLC (57) ABSTRACT

Example implementations relate to antenna polarization patterns. In some examples, a network device may comprise a processing resource and a memory resource storing machine-readable instructions to group antenna polarization patterns into polarization groups (PG)s, determine a respective packet error rate (PER) of a representative antenna polarization patter of each PG of the PGs, select a PG of the PGs with the representative antenna polarization pattern having the lowest determined PER of the PGs, and associate with a client device an antenna polarization pattern having the lowest determined PER of the selected PG.

20 Claims, 4 Drawing Sheets

(58) Field of Classification Search
USPC .......................................................... 375/267
See application file for complete search history.

(56) References Cited

U.S. PATENT DOCUMENTS

| | | | |
|---|---|---|---|
| 8,649,747 | B1 | 2/2014 | Emmanuel et al. |
| 9,344,165 | B2 | 5/2016 | Wang |
| 2003/0162566 | A1* | 8/2003 | Shapira .................. H01Q 1/246 |
| | | | 455/561 |
| 2007/0002892 | A1* | 1/2007 | Waxman ................ H04B 7/061 |
| | | | 370/465 |
| 2008/0248802 | A1* | 10/2008 | Krishnamoorthy .. H01Q 3/2605 |
| | | | 455/445 |
| 2010/0297947 | A1* | 11/2010 | Rofougaran ......... H04B 7/0682 |
| | | | 455/63.1 |
| 2012/0162008 | A1 | 6/2012 | Eom et al. |
| 2015/0110012 | A1* | 4/2015 | Bhushan ............... H04W 74/08 |
| | | | 370/329 |
| 2015/0341157 | A1 | 11/2015 | Eltawil et al. |
| 2016/0226568 | A1 | 8/2016 | Ponnuswamy |
| 2016/0233944 | A1 | 8/2016 | Viswanathan |

FOREIGN PATENT DOCUMENTS

| | | |
|---|---|---|
| CN | 104638383 | 5/2015 |
| WO | WO-2014124335 | 8/2014 |
| WO | WO-2015112048 | 7/2015 |

OTHER PUBLICATIONS

International Searching Authority, The International Search Report and the Written Opinion, dated Dec. 5, 2017, PCT/CN2017/075841, 11 Pgs.

Extended European Search Report received for EP Patent Application No. 17899826.6, dated Aug. 10, 2020, 11 pages.

* cited by examiner

ANTENNA POLARIZATION PATTERNS

BACKGROUND

An antenna can generate and/or receive electromagnetic waves. Antenna polarization can be the orientation of the electromagnetic waves with respect to the Earth's surface. Antenna polarization may be a factor in a quality of a radio communication signal sent between a transmitter and a receiver. In some situations, if the antenna polarization of the receiver matches the antenna polarization of the transmitter, the receiver can achieve a radio communication signal that is a better quality than if the antenna polarization of the receiver does not match the antenna polarization of the transmitter.

A multiple-input and multiple-output (MIMO) network device may utilize a radio channel to send and receive more than one data signal simultaneously. The network device may include multiple radio chains with multiple antennas. A MIMO network device may include different antenna polarization combinations.

DETAILED DESCRIPTION

A network device such as a MIMO network device may use multiple radio chains to transmit and/or receive information. A radio chain may include two antennas. As used herein, the term "radio chain" can, for example, refer to hardware to transmit and/or receive information via radio signals. A first antenna of a radio chain may be a horizontal antenna, and a second antenna of the radio chain may be a vertical antenna. Client devices may communicate with the network device using these radio chains. As used herein, the term "antenna" can, for example, refer to a device that converts electric power into radio waves, and/or vice versa.

In some implementations, a network device can determine an antenna polarization patter for different client devices associated with the network device. As used herein, the term "antenna polarization pattern" can, for example, refer to a pattern of antenna polarization combinations included in radio chains of a network device, where the pattern corresponds to a client device associated with the network device. As an example, a first client device and a second client device may associate with the network device. The first client device associated with the network device may be in a first physical orientation and the second client device associated with the network device may be in a second physical orientation, which may result in their respective antenna being in different orientations relative to the network device. In such a situation, the first client device may achieve a better signal quality with an antenna polarization pattern different from an antenna polarization pattern for the second client device. The network device may associate a first antenna polarization patter with the first client device, and a second antenna polarization pattern with the second client device.

A network device with multiple radio chains may include different combinations of antenna polarization patterns. When a client device associates with the network device, it may take a long period of time to determine a signal quality for the client device from all possible combinations of antenna polarization patterns.

As used herein, the term "information" can, for example, refer to data, addresses, control, management (e.g., statistics) or any combination thereof. For data transmission, information may be transmitted as a message, namely a collection of bits in a predetermined format. A message such as wireless message may include a header and payload data having a predetermined number of bits of information. The wireless message may be placed in a format as a plurality of packets, frames or cells.

In some implementations, antenna polarization patterns can promote selection of an antenna polarization pattern for a client device without having to determine a signal quality for all possible combinations of antenna polarization patterns. Using this selection mechanism, an antenna polarization patter can be determined efficiently and may reduce a chance of a client device connectivity issue with the network device. As used herein, the term "mechanism" can, for example, refer to a component of a system or device to serve a plurality of functions, including but not limited to, software components, electronic components, electrical components, mechanical components, electro-mechanical components, etc.

Figure 1:
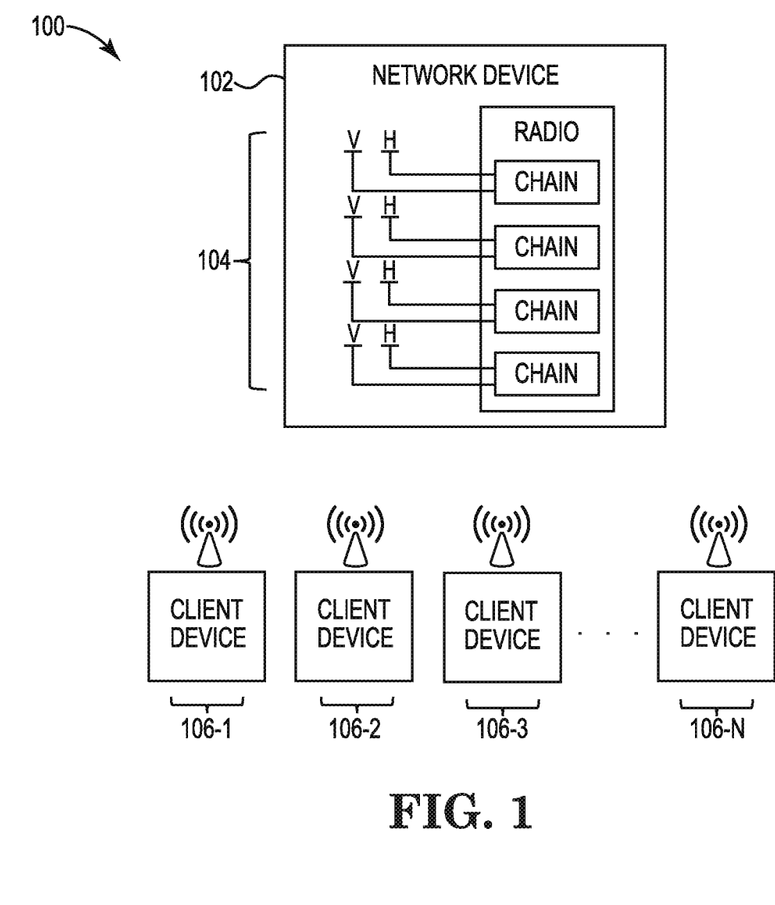
FIG. 1 illustrates an example of a network layout consistent with the disclosure.

FIG. 1 illustrates an example of a network layout 100 consistent with the disclosure. As illustrated in FIG. 1, the network layout 100 may include network device 102, antennas 104, and client devices 106-1, 106-2, 106-3, 106-N (referred to collectively as client devices 106).

Network device 102 can group antenna polarization patterns into polarization groups (PG)s. As used herein, the term "PGs" can, for example, refer to groups including combinations of similar antenna polarization patterns. For example, a PG can include antenna polarization patterns related to a vertical antenna, antenna polarization patterns related to a horizontal antenna, and/or antenna polarization patterns related to a cross-polarization antenna, as is described herein. As used herein, the term "network device" can, for example, refer to a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

Network device 102 can be an access point (AP). An AP can refer to a networking device that allows a client device to connect to a wired or wireless network. As used herein, the term "access point" (AP) can, for example, refer to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards. An AP can include a processing resource, memory, and/or input/output interfaces, including wired network interfaces such as IEEE 802.3 Ethernet interfaces, as well as wireless network interfaces such as IEEE 802.11 Wi-Fi interfaces, although examples of the disclosure are not limited to such interfaces. An AP can include a memory resource, including read-write memory, and a hierarchy of persistent memory such as ROM, EPROM, and Flash memory.

In some examples, network device 102 can be a controller. The controller can include a processing resource such as a processing resource, memory, and input/output interfaces, including wired network interfaces such as IEEE 802.3 Ethernet interfaces, as well as wireless network interfaces such as IEEE 802.11 Wi-Fi interfaces, although examples of the disclosure are not limited to such interfaces. A controller can include a memory resource, including read-write memory, and a hierarch of persistent memory such as ROM, EPROM, and Flash memory.

As used herein, the term "client device" can, for example, refer to a device including a processing resource, memory, and input/output interfaces for wired and/or wireless communication. For example, a client device may include a laptop computer, a desktop computer, a mobile device, and/or other wireless devices, although examples of the disclosure are not limited to such devices. A mobile device may, for example, refer to devices that are (or may be) carried and/or worn by a user. For instance, a mobile device can be a phone (e.g., a smart phone), a tablet, a personal digital assistant (PDA), smart glasses, and/or a wrist-worn device (e.g., a smart watch), among other types of mobile devices.

Client devices 106 may connect to network device 102 via a network relationship. As used herein, the term "network relationship" can, for example, refer to a local area network (LAN), VLAN, wide area network (WAN), personal area network (PAN), a distributed computing environment (e.g., a cloud computing environment), storage area network (SAN), Metropolitan area network (MAN), a cellular communications network, and/or the Internet, among other types of network relationships.

Network device 102 can include a plurality of antennas 104. Network device 102 can include a radio including four chains, where each chain includes two antennas. For instance, each radio chain can include a horizontal antenna and a vertical antenna.

As shown in FIG. 1, network device 102 can be a 4×4 MIMO network device. An antenna polarization patter, based on the plurality of antennas 104 shown in FIG. 1, can include each of the radio chains having vertical antennas 104 associated with a client device 106 (e.g., VVVV), each of the radio chains having horizontal antennas 104 associated with a client device 106 (e.g., HHHH), and/or any combination thereof (e.g., VHVH). That is, based on the 4×4 MIMO network device 102, there exists sixteen possible antenna polarization patterns: VVVV, VVVH, VVHV, VHVV, HVVV, VVHH, VHVH, VHHV, HVVH, HVHV, HHVV, VHHH, HVHH, HHVH, HHHV, HHHH.

Although not shown in FIG. 1 for clarity and so as not to obscure examples of the disclosure, each of the radio chains can be connected to the plurality of antennas 104 via a radio frequency (RF) switch. As used herein, the term "switch" can, for example, refer to a computer networking device that connects devices together on a network by using, for example, packet switching to receive, process and forward data to a destination device. For example, a switch can include memory, including read-write memory, and a hierarch of persistent memory such as ROM, EPROM, and Flash memory.

Network device 102 can group antenna polarization patterns into PGs. For example, network device 102 can group antenna polarization patterns into a vertical polarization group (VPG), a horizontal polarization group (HPG), and/or a cross-polarization group (CPG), although examples of the disclosure are not limited to VPG, HPG, and/or CPG groups.

The VPG can include antenna polarization patterns tending to be vertically oriented. For example, based on a 4×4 MIMO network device 102, the VPG can include antenna polarization patterns including: VVVV, VVVH, VVHV, VHVV, HVVV. That is, of the sixteen possible antenna polarization patterns of a 4×4 MIMO network device 102, the VPG can include five antenna polarization patterns that include radio chains with antennas 104 tending to be vertically oriented.

Each PG can include a representative antenna polarization pattern. As used herein, the term "representative polarization pattern" can, for example, refer to an antenna polarization pattern that indicates the orientation of the antennas 104 the antenna polarization patterns included in a PG are tending towards.

The VPG can include a representative antenna polarization pattern. The representative antenna polarization pattern of the VPG can be VVVV. The VVVV antenna polarization pattern can indicate the orientation of the antennas 104 of the VPG tend to be vertically oriented.

The HPG can include antenna polarization patterns tending to be horizontally oriented. For example, based on a 4×4 MIMO network device 102, the HPG can include antenna polarization patterns including: HHHH, HHHV, HHVH, HVHH, VHHH. That is, of the sixteen possible antenna polarization patterns of a 4×4 MIMO network device 102, the HPG can include five antenna polarization patterns that include radio chains with antennas 104 tending to be horizontally oriented.

The HPG can include a representative antenna polarization pattern. The representative antenna polarization pattern of the HPG can be HHHH. The HHHH antenna polarization pattern can indicate the orientation of the antennas 104 of the HPG tend to be horizontally oriented.

The CPG can include antenna polarization patterns tending to be horizontally and vertically oriented. For example, based on a 4×4 MIMO network device 102, the CPG can include the remaining antenna polarization patterns tending towards being a combination of horizontally and vertically oriented, including: VHVH, VVHH, VHHV, HVVH, HVHV, HHVV. That is, of the sixteen possible antenna polarization patterns of a 4×4 MIMO network device 102, the CPG can include six antenna polarization patterns that include radio chains with antennas 104 tending towards being equally horizontally oriented and vertically oriented.

The CPG can include a representative antenna polarization pattern. The representative antenna polarization pattern of the CPG can be VHVH, although examples of the disclosure are not limited to the representative antenna polarization pattern of CPG being VHVH. The VHVH antenna polarization pattern can indicate the orientation of the antennas 104 of the CPG tend to be horizontally and vertically oriented.

Although network device 102 is shown in FIG. 1 and described as a 4×4 MIMO network device, examples of the disclosure are not so limited. For example, network device 102 may be a MIMO network device with smaller than a 4×4 antenna and radio chain configuration, or a MIMO network device with greater than a 4×4 antenna and radio chain configuration.

Network device 102 can determine a respective packet error rate (PER) of a representative antenna polarization pattern of each PG of the PGs in response to a client device 106 associating with network device 102. That is, network device 102 can determine a PER of the representative antenna polarization patter of the VPG, HPG, and CPG in response to a client device 106 associating with network device 102. As used herein, the term "PER" can, for example, refer to a quantity of packet errors divided by a total quantity of packets transferred. The PER can be measured over a specified and/or predetermined interval, including time, threshold packets transferred, etc. The predetermined interval can be configurable.

As an example, based on the 4×4 MIMO network device 102 shown in FIG. 1, network device 102 can determine a PER of the VVVV antenna polarization pattern, the HHHH antenna polarization patter, and the VHVH antenna polarization patter, where VVVV, HHHH, and VHVH are the representative antenna polarization patterns of the VPG, HPG, and CPG, respectively. The PER of VVVV, HHHH, and VHVH can be determined in response to a client device 106 (e.g., client device 106-1) associating with network device 102. That is, packets may be transmitted to and received from client device 106-1 using each of the VVVV, HHHH, and VHVH antenna polarization patterns of network device 102, and the PER of VVVV, HHHH, and VHVH can be determined after a specified interval (e.g., time, threshold packets, etc.)

Network device 102 can determine the PER of each of the respective representative antenna polarization patterns of the PGs using a training data transmission rate. As used herein, the term "data transmission rate" can, for example, refer to a quantity of packets that are transmitted and/or received at the physical layer per unit of time. That is, network device 102 can determine the PER of VVVV, HHHH, and VHVH antenna polarization patterns of the VPG, HPG, and CPG, respectively using the training data transmission rate.

Network device 102 can determine the training data transmission rate. To determine the training data transmission rate, network device 102 can transmit a plurality of frames to a client device 106 (e.g., client device 106-1) at different data transmission rates using a default antenna polarization pattern associated with client device 106-1. For example, network device 102 may have a default antenna polarization pattern of VHHV associated with client device 106-1. Network device 102 can transmit a plurality of frames to client device 106-1 at a first data transmission rate, a second data transmission rate, and a third data transmission rate, etc. The quantity of different data transmission rates can be predetermined and/or configurable. The plurality of frames transmitted to client device 106-1 at each of the different data transmission rates can be predetermined and/or configurable.

Network device 102 can determine, in response to a threshold plurality of frames being transmitted to client device 106 at each of the different data transmission rates, the PER of each of the different data transmission rates. For example, network device 102 may determine the PER of the first data transmission rate after transmitting a threshold plurality of frames to client device 106-1 using the default antenna polarization pattern (e.g., VHHV) associated with client device 106-1. Similarly, network device 102 may determine the PER of the second data transmission rate and the PER of the third data transmission rate after transmitting the threshold plurality of frames.

Network device 102 can select a data transmission rate having the lowest PER of the different data transmission rates to be the training data transmission rate. Continuing with the example above, network device 102 may determine that the PER of the second data transmission rate is lower than the PER of the first data transmission rate and the third data transmission rate. As a result, network device 102 may select the second data transmission rate to be the training data transmission rate. The second data transmission rate can then be used to determine the PER of each of the respective representative antenna polarization patterns of the VPG, HPG, and CPG, as described above.

Although network device 102 is described above as transmitting a plurality of frames to a client device 106 using three different data transmission rates in determining the training data rate, examples of the disclosure are not so limited. For example, network device 102 may transmit the plurality of frames to a client device 106 using less than three different data transmission rates or more than three different data transmission rates.

Network device 102 can select a PG of the PGs with the representative antenna polarization pattern having the lowest determined PER of the PGs. That is, network device 102 can select a PG of the VPG, HPG, or CPG with the representative antenna polarization pattern having the lowest determined PER. For example, network device 102 can select VPG in response to the representative antenna polarization pattern of VPG (e.g., VVVV) having the lowest determined PER, HPG in response to the representative antenna polarization pattern of HPG (e.g., HHHH) having the lowest determined PER, or CPG in response to the representative antenna polarization pattern of CPG (e.g., VHVH) having the lowest determined PER.

Network device 102 can determine a PER of each antenna polarization patter included in the selected PG. Network device 102 may refrain from determining a PER of each antenna polarization patter included in the remaining PGs. For example, network device 102 can select VPG in response to the representative antenna polarization pattern of VPG (e.g., VVVV) having the lowest determined PER. Network device 102 may then determine a PER of each antenna polarization patter included in VPG. For instance, after selecting VPG, network device 102 can determine the PER of VVVV, VVVH, VVHV, VHVV, and HVVV, the antenna polarization patterns of VPG. Continuing with this example, network device 102 can refrain from determining a PER of each antenna polarization patter included in HPG and CPG. In other words, network device 102 can determine a PER of the antenna polarization patterns of VPG (e.g., VVVV, VVVH, VVHV, VHVV, HVVV), but refrain from determining at least some of the antenna polarization patterns of HPG (e.g., HHHV, HHVH, HVHH, VHHH) and CPG (e.g., VVHH, VHHV, HVVH, HVHV, HHVV). That is, since network device 102 has determined the representative antenna polarization patterns of HPG and CPG, network device 102 can refrain from determining the remaining antenna polarization patterns included in HPG and CPG.

Although network device 102 is described above as selecting VPG and determining the PER of the antenna polarization patterns of VPG and refraining from determining the PER of each antenna polarization patter included in HPG and CPG, examples of the disclosure are not so limited. In some examples, network device 102 can select HPG and determine the PER of the antenna polarization patterns of HPG while refraining from determining the PER of at least some antenna polarization patterns included in VPG and CPG. That is, other than the representative antenna polarization patterns of VPG and CPG, PERs of each of the antenna polarization patterns included in the VPG and the CPG are not determined. Similarly, in some examples, network device 102 can select CPG and determine the PER of the antenna polarization patterns of CPG while refraining from determining the PER of at least some of the antenna polarization patterns included in VPG and HPG.

Network device 102 can transmit a threshold plurality of frames at each antenna polarization patter in the selected group. For example, based on network device 102 selecting VPG, network device 102 can transmit a threshold plurality of frames at each antenna polarization pattern in VPG. For instance, network device 102 can transmit a threshold plurality of frames at antenna polarization pattern VVVV, a threshold plurality of frames at antenna polarization pattern VVVH, a threshold plurality of frames at antenna polarization pattern VVHV, a threshold plurality of frames at antenna polarization pattern VHVV, and a threshold plurality of frames at antenna polarization pattern HVVV. The threshold plurality of frames can be transmitted to each antenna polarization pattern in the selected group using the training data transmission rate.

In some examples, network device 102 can determine an acknowledgment (ACK) received signal strength indicator (RSSI) of each antenna polarization pattern included in the selected group. As used herein, the term "ACK" can, for example, refer to a signal transmitted between communicating components to signify acknowledgment or receipt of a response. As used herein, the term "ACK RSSI" can, for example, refer to the received signal strength indication of the ACK signal.

For example, network device 102 can select VPG in response to the representative antenna polarization patter of VPG (e.g., VVVV) having the lowest determined PER. Network device 102 may then determine an ACK RSSI of each antenna polarization patter included in VPG. For instance, after selecting VPG, network device 102 can determine the ACK RSSI of VVVV, VVVH, VVHV, VHVV, and HVVV, the antenna polarization patterns of VPG. Network device 102 can refrain from determining an ACK RSSI of each antenna polarization patter included in HPG and CPG as a result of VPG being selected.

Network device 102 can associate, with a client device 106, an antenna polarization pattern having the lowest determined PER of the selected PG. That is, network device 102 can associate an antenna polarization patter having the lowest determined PER of VPG, HPG, or CPG. Continuing with the example above, network device 102 has selected VPG and determined the PER of each of the antenna polarization patterns of VPG (e.g., VVVV, VVVH, VVHV, VHVV, and HVVV) in response to client device 106-1 associating with network device 102. Network device 102 can determine that the antenna polarization pattern VVHV has a lower PER than the remaining VVVV, VVVH, VHVV, and HVVV antenna polarization patterns of VPG, and can associate VVHV as the antenna polarization pattern for client device 106-1.

In some examples, network device 102 can associate, with a client device 106, an antenna polarization pattern having a higher ACK RSSI in response to a plurality of the antenna polarization patterns of the selected group having the same determined PER. In other words, if two or more antenna polarization patterns have a same determined PER that is the lowest PER of the selected group, network device 102 can compare the ACK RSSI of the two or more antenna polarization patterns having the same PER.

For example, network device 102 can determine that antenna polarization patterns VVHV and VHVV have the same PER. Network device 102 can determine that antenna polarization pattern VVHV has a higher ACK RSSI than antenna polarization pattern VHVV. In response, network device 102 can associate antenna polarization patter VVHV as the antenna polarization patter for client device 106-1.

Network device 102 can repeat the above process in response to other client devices 106 associating with network device 102. For example, network device 102 can associate, in response to client device 106-N associating with network device 102, an antenna polarization pattern from a PG of the PGs with client device 106-N based on to the representative antenna polarization patter of the selected PG having a suitable PER for client device 106-N.

Antenna polarization patterns according to the disclosure can be used to shorten an amount of time taken by a network device to determine an antenna polarization patter to associate with a client device in response to the client device associating with the network device. By grouping a total quantity of different antenna polarization patter combinations into groups and selecting one group of antenna polarization patter combinations to check for signal quality, the network device can avoid checking all possible antenna polarization pattern combinations. As a result, the network device can more quickly associate an antenna polarization pattern with the client device, reducing chances of client device connectivity issues with the network device.

Figure 2:
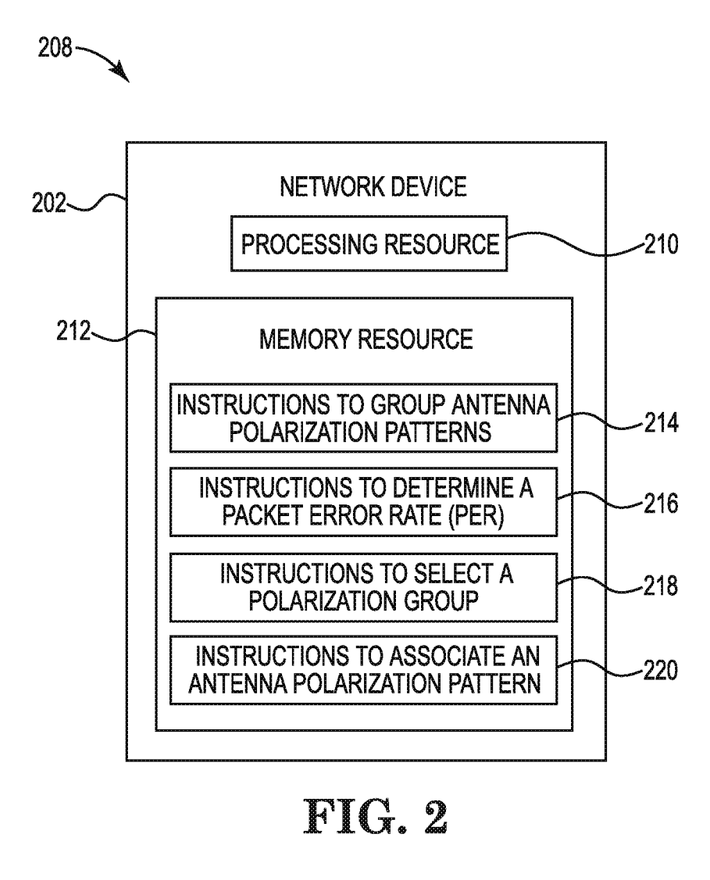
FIG. 2 is a block diagram of an example of a network device for antenna polarization patterns consistent with the disclosure.

FIG. 2 is a block diagram 208 of an example network device 202 for antenna polarization patterns, consistent with the disclosure. As described herein, the network device 202 (e.g., network device 102, previously described in connection with FIG. 1) may perform a function related to antenna polarization patterns. Although not illustrated in FIG. 2, the network device 202 may include a processing resource and a machine-readable storage medium. Although the following descriptions refer to an individual processing resource and an individual machine-readable storage medium, the descriptions may also apply to a system with multiple processing resources and multiple machine-readable storage mediums. In such examples, the network device 202 may be distributed across multiple machine-readable storage mediums and the network device 202 may be distributed across multiple processing resources. Put another way, the instructions executed by the network device 202 may be stored across multiple machine-readable storage mediums and executed across multiple processing resources, such as in a distributed or virtual computing environment.

As illustrated in FIG. 2, the network device 202 may comprise a processing resource 210, and a memory resource 212 storing machine-readable instructions to cause the processing resource 210 to perform an operation relating to antenna polarization patterns. That is, using the processing resource 210 and the memory resource 212, the network device 202 may associate an antenna polarization pattern with a client device, among other operations. Processing resource 210 may be a central processing unit (CPU), microprocessor, and/or other hardware device suitable for retrieval and execution of instructions stored in memory resource 212.

The network device 202 may include instructions 214 stored in the memory resource 212 and executable by the processing resource 210 to group antenna polarization patterns. For example, network device 202 may include instructions 214 stored in the memory resource 212 and executable by the processing resource 210 to group antenna polarization patterns into polarization groups (PG)s.

The network device 202 may include instructions 216 stored in the memory resource 212 and executable by the processing resource 210 to determine a PER. For example, network device 202 may include instructions 216 stored in the memory resource 212 and executable by the processing resource 210 to determine a PER of a representative antenna polarization patter of each PG of the PGs in response to a client device (e.g., client device 106, described in connection with FIG. 1) associating with network device 202. As described in relation to FIG. 1, a representative antenna polarization pattern can be an antenna polarization pattern that indicates an orientation of the antennas the antenna polarization patterns included in a PG are tending towards.

The network device 202 may include instructions 218 stored in the memory resource 212 and executable by the processing resource 210 to select a polarization group. For example, network device 202 may include instructions 218 stored in the memory resource 212 and executable by the processing resource 210 to select a PG of the PGs with the representative antenna polarization pattern having the lowest determined PER of the PGs.

The network device 202 may include instructions 220 stored in the memory resource 212 and executable by the processing resource 210 to associate an antenna polarization pattern. For example, network device 202 may include instructions 220 stored in the memory resource 212 and executable by the processing resource 210 to associate antenna polarization pattern having the lowest determined PER of the selected PG.

In this manner, the network device 202 may group antenna polarization patterns, determine a PER, select a polarization group, and associate an antenna polarization pattern with a client device in response to the client device associating with network device 202.

Figure 3:
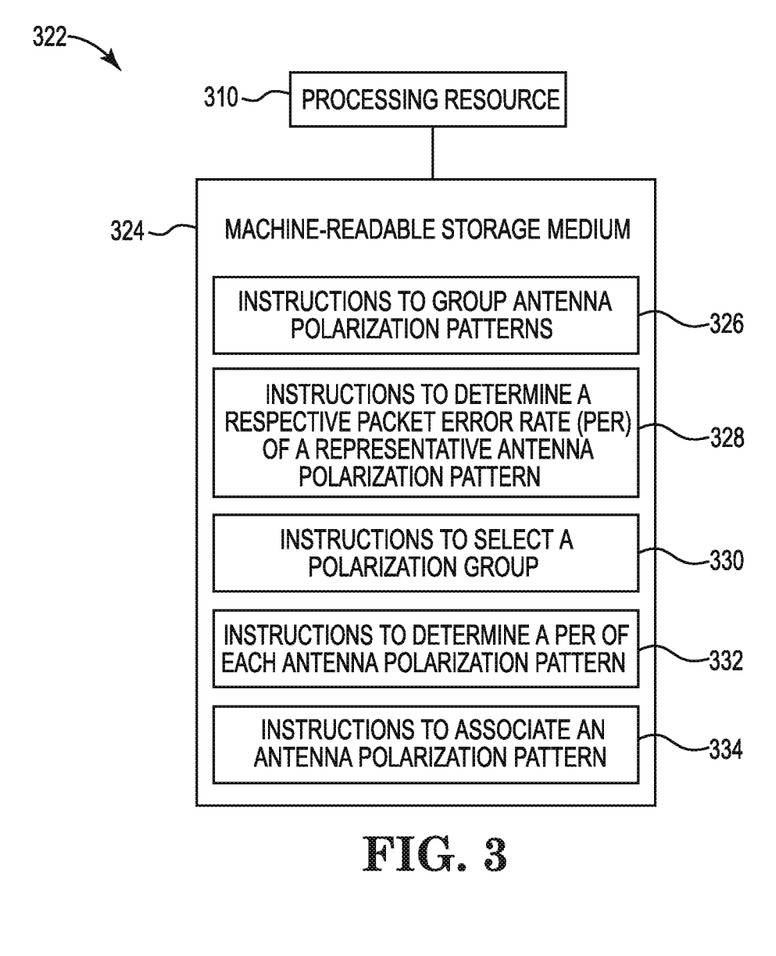
FIG. 3 is a block diagram of an example of a system consistent with the disclosure.

FIG. 3 is a block diagram of an example system 322, consistent with the disclosure. In the example of FIG. 3, system 322 includes a processing resource 310 (e.g., processing resource 110, 210, previously described in connection with FIGS. 1 and 2, respectively) and a machine-readable storage medium 324. Although the following descriptions refer to an individual processing resource and an individual machine-readable storage medium, the descriptions may also apply to a system with multiple processing resources and multiple machine-readable storage mediums. In such examples, the instructions may be distributed across multiple machine-readable storage mediums and the instructions may be distributed across multiple processing resources. Put another way, the instructions may be stored across multiple machine-readable storage mediums and executed across multiple processing resources, such as in a distributed computing environment.

Processing resource 310 may be a central processing unit (CPU), microprocessor, and/or other hardware device suitable for retrieval and execution of instructions stored in machine-readable storage medium 324. In the particular example shown in FIG. 3, processing resource 310 may receive, determine, and send instructions 326, 328, 330, 332, and 334. As an alternative or in addition to retrieving and executing instructions, processing resource 310 may include an electronic circuit comprising an electronic component for performing the operations of the instructions in machine-readable storage medium 324. With respect to the executable instruction representations or boxes described and shown herein, it should be understood that part or all of the executable instructions and/or electronic circuits included within one box may be included in a different box shown in the figures or in a different box not shown.

Machine-readable storage medium 324 may be any electronic, magnetic, optical, or other physical storage device that stores executable instructions. Thus, machine-readable storage medium 324 may be, for example, Random Access Memory (RAM), an Electrically-Erasable Programmable Read-Only Memory (EEPROM), a storage drive, an optical disc, and the like. The executable instructions may be "installed" on the system 322 illustrated in FIG. 3. Machine-readable storage medium 324 may be a portable, external or remote storage medium, for example, that allows the system 322 to download the instructions from the portable/external/remote storage medium. In this situation, the executable instructions may be part of an "installation package". As described herein, machine-readable storage medium 324 may be encoded with executable instructions related to antenna polarization patterns.

Instructions to group antenna polarization patterns 326, when executed by processing resource 310, may cause system 322 to group antenna polarization patterns into polarization groups (PG)s. PGs can include a vertical polarization group (VPG), a horizontal polarization group (HPG), and a cross-polarization group (CPG).

Instructions to determine a respective PER of a representative antenna polarization patter 328, when executed by processing resource 310, may cause system 322 to determine a respective PER of a representative antenna polarization patter of each of the VPG, the HPG, and the CPG. Determining the respective PER of the representative antenna polarization patter of each of the VPG, the HPG, and the CPG can be in response to a client device (e.g., client device 106, previously described in connection with FIG. 1) associating with the network device (e.g., network device 102, 202, described in connection with FIGS. 1 and 2, respectively).

Instructions to select a polarization group 330, when executed by processing resource 310, may cause system 322 to select the VPG, the HPG, or the CPG as a selected group that includes the representative antenna polarization pattern having the lowest determined PER of the PGs.

Instructions to determine a PER of each antenna polarization patter 332, when executed by processing resource 310, may cause system 322 to determine a PER of each antenna polarization pattern included in the selected group. As described in FIG. 1, system 322 can refrain from determining a PER of each antenna polarization patter included in the remaining groups.

Instructions to associate an antenna polarization pattern 334, when executed by processing resource 310, may cause system 322 to associate an antenna polarization pattern having the lowest determined PER of the selected group.

Figure 4:
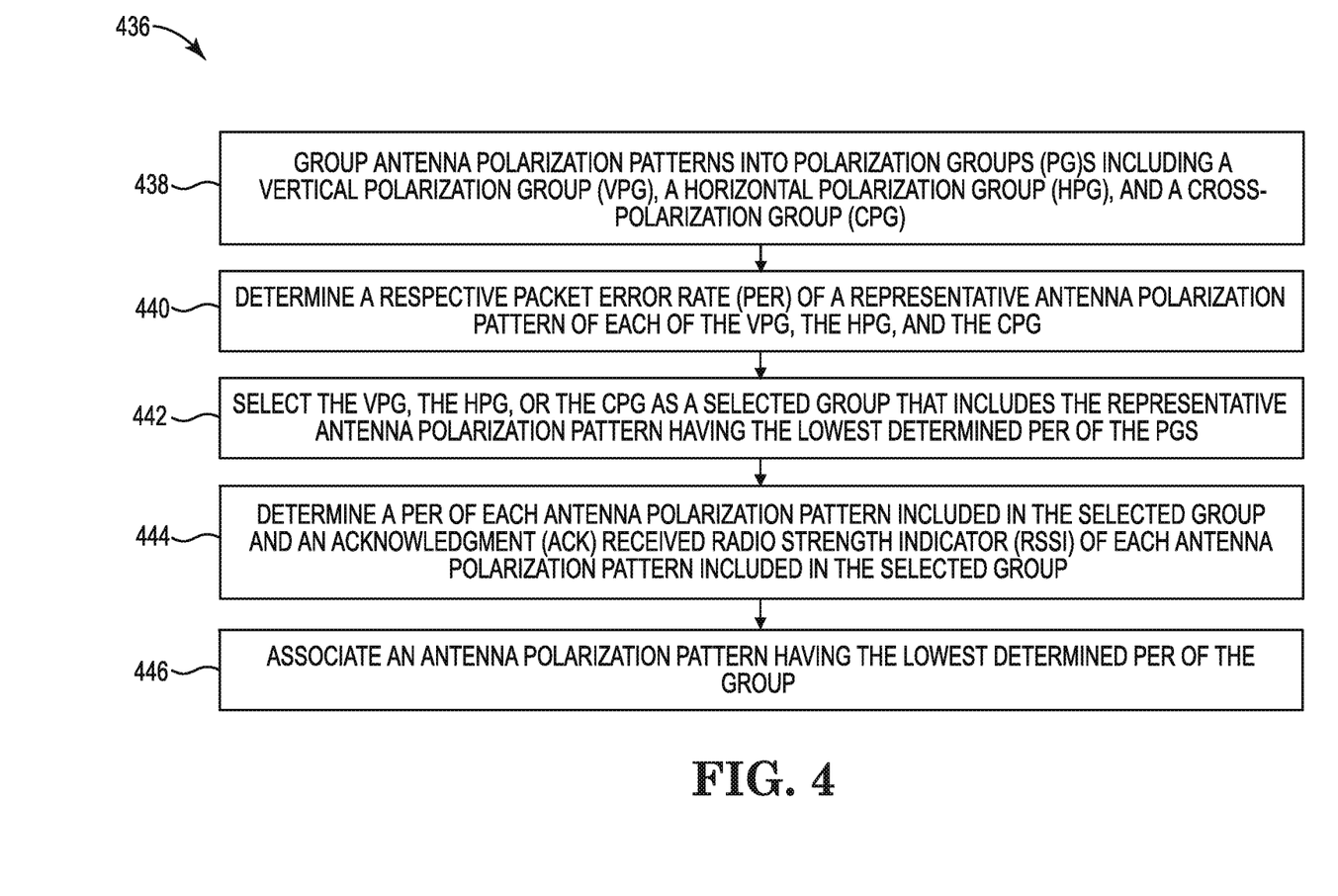
FIG. 4 illustrates an example of a method consistent with the disclosure.

FIG. 4 illustrates an example method 436 consistent with the disclosure. Method 436 may be performed by a network device (e.g., network device 102, 202, described in connection with FIGS. 1 and 2, respectively).

At 438, the method 436 may include grouping antenna polarization patterns into polarization groups (PG)s including a vertical polarization group (VPG), a horizontal polarization group (HPG), and a cross-polarization group (CPG).

At 440, the method 436 may include determining a respective PER of a representative antenna polarization pattern of each of the VPG, the HPG, and the CPG. For example, a first representative antenna polarization pattern can be included in and represent the VPG, a second representative antenna polarization pattern can be included in and represent the HPG, and a third representative antenna polarization pattern can be included in and represent the CPG. The PER of the first, the second, and the third representative antenna polarization patters may be determined.

The PER of the representative antenna polarization pattern of each of the VPG, the HPG, and the CPG may be determined using a training data transmission rate between the network device and a client device (e.g., client device 106, previously described in connection with FIG. 1) in response to the client device associating with the network device.

At 442, the method 436 may include selecting the VPG, the HPG, or the CPG as a selected group that includes the representative antenna polarization patter having the lowest determined PER of the PGs. For example, the representative antenna polarization patter VVVV may be determined to have a lower PER than HHHH and VHVH, where VVVV, HHHH, and VHVH are the representative antenna polarization patters of VPG, HPG, and CPG, respectively. In response to VVVV having a lower PER than HHHH and VHVH, VPG may be selected as the selected group.

At 444, the method 436 may include determining a PER of each antenna polarization pattern included in the selected group and an acknowledgment (ACK) received radio strength indicator (RSSI) of each antenna polarization pattern included in the selected group. For example, the PER and ACK RSSI of VVVV, VVVH, VVHV, VHVV, HVVV may be determined based on VPG being the selected group.

At 446, the method 436 may include associating an antenna polarization pattern having the lowest determined PER of the selected group with a client device. For example, VHVV may be determined to have a lower PER than VVVV, VVVH, VVHV, and HVVV. VHVV may be associated with the client device.

In some examples, a plurality of antenna polarization patterns of the selected group may be determined to have the same PER that are the lowest of the selected group. For example, VHVV and HVVV may be determined to have the lowest determined PER of the selected group.

In response to the plurality of antenna polarization patterns of the selected group having the same determined PER, an antenna polarization having a higher ACK RSSI of the plurality of the antenna polarization patterns may be associated with the client device. For example, of the VHVV and HVVV antenna polarizations having the same lowest determined PER, VHVV may have a higher ACK RSSI than HVVV. In response, VHVV may be associated with the client device.

Method 436 may be repeated. In some examples, method 436 may be repeated for a new client device in response to the new client device associating with the network device. In some examples, method 436 may be repeated for an existing client device after a threshold period of time, although examples of the disclosure are not limited to repeating method 436 for an existing client device after a threshold period of time.

Using method 436, client devices associating with the network device can be associated with an antenna polarization pattern with a suitable PER. Method 436 can allow for quick association of an antenna polarization patter with a client device and reduce chances of client device connectivity issues with the network device as compared to other approaches that do not employ representative antenna polarization groups and therefore may test all possible antenna polarizations combinations.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure.

The figures herein follow a numbering convention in which the first digit corresponds to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2. Elements shown in the various figures herein can be added, exchanged, and/or eliminated so as to provide a plurality of additional examples of the disclosure. In addition, the proportion and the relative scale of the elements provided in the figures are intended to illustrate the examples of the disclosure, and should not be taken in a limiting sense. As used herein, the designator "N", particularly with respect to reference numerals in the drawings, indicates that a plurality of the particular feature so designated can be included with examples of the disclosure. The designators can represent the same or different numbers of the particular features. Further, as used herein, "a plurality of" an element and/or feature can refer to more than one of such elements and/or features.

What is claimed:

1. A network device, comprising:
 a processing resource; and
 a memory resource storing machine-readable instructions to cause the processing resource to:
  group available antenna polarization patterns into polarization groups, wherein the polarization groups comprise at least a first polarization group and a second polarization group;
  in response to a first plurality of frames being transmitted to a client device at a first data transmission rate, determine a first packet error rate (PER) of the first data transmission rate for the first polarization group;
  in response to a second plurality of frames being transmitted to the client device at a second data transmission rate, determine a second packet error rate (PER) of the second data transmission rate for the second polarization group;
  select the second polarization group based on the second packet error rate (PER) having the lowest determined PER of the polarization groups; and
  associate, with the client device, an antenna polarization pattern from the second polarization group without determining a signal quality for all possible combinations of antenna polarization patterns from the first polarization group.

2. The network device of claim 1, including instructions to cause the processing resource to:
 determine a first corresponding PER of each antenna polarization pattern included in the second polarization group; and
 refrain from determining a second corresponding PER of each antenna polarization pattern included in the first polarization group.

3. The network device of claim 1, wherein the polarization groups include a vertical group, and wherein an antenna polarization pattern of the vertical group is a vertical antenna polarization of antennas of the network device.

4. The network device of claim 1, wherein the polarization groups include a horizontal group, and wherein an antenna polarization pattern of the horizontal group is a horizontal antenna polarization of antennas of the network device.

5. The network device of claim 1, wherein the polarization groups include a cross-polarization group, and wherein an antenna polarization pattern of the cross-polarization group is a horizontal and vertical antenna polarization of antennas of the network device.

6. The network device of claim 1, wherein the network device includes a plurality of antennas having a plurality of antenna polarization patterns.

7. The network device of claim 1, wherein the network device is an access point (AP).

8. The network device of claim 1, wherein the network device is a controller.

9. A non-transitory machine-readable storage medium having stored thereon machine-readable instructions to cause a computing processor to:
 group, by a network device, available antenna polarization patterns into polarization groups, wherein the polarization groups comprise at least a first polarization group and a second polarization group;
 in response to a first plurality of frames being transmitted to a client device at a first data transmission rate, determine a first packet error rate (PER) of the first data transmission rate for the first polarization group;
 in response to a second plurality of frames being transmitted to the client device at a second data transmission rate, determine a second packet error rate (PER) of the second data transmission rate for the second polarization group;
 select the second polarization group based on the second packet error rate (PER) having the lowest determined PER of the polarization groups; and
 associate, with the client device, an antenna polarization pattern from the second polarization group without determining a signal quality for all possible combinations of antenna polarization patterns from the first polarization group.

10. The non-transitory machine-readable storage medium of claim 9, further comprising instructions to: transmit a threshold plurality of frames at each antenna polarization pattern in the second polarization group, wherein the threshold plurality of frames are transmitted using a training data transmission rate.

11. The non-transitory machine-readable storage medium of claim 9, further comprising instructions to:
 determine an acknowledgment (ACK) received signal strength indicator (RSSI) of each antenna polarization pattern included in the second polarization group; and
 associate, with the client device, an antenna polarization pattern having a higher ACK RSSI in response to a plurality of the antenna polarization patterns of the second polarization group having a same determined PER as the second packet error rate.

12. A method, comprising:
 grouping, by a network device, available antenna polarization patterns into polarization groups, wherein the polarization groups comprise at least a first polarization group and a second polarization group;
 in response to a first plurality of frames being transmitted to a client device at a first data transmission rate, determining, by the network device, a first packet error rate (PER) of the first data transmission rate for the first polarization group;
 in response to a second plurality of frames being transmitted to the client device at a second data transmission rate, determine a second packet error rate (PER) of the second data transmission rate for the second polarization group;
 selecting, by the network device, the second polarization group based on the second packet error rate (PER) having the lowest determined PER of the polarization groups;
 associating with the client device by the network device, an antenna polarization pattern from the second polarization group without determining a signal quality for all possible combinations of antenna polarization patterns from the first polarization group.

13. The method of claim 12, wherein the polarization groups include a vertical polarization group (VPG), a horizontal polarization group (HPG), and a cross-polarization group (CPG).

14. The method of claim 12, further comprising:
 transmitting the second plurality of frames to the client device at different data transmission rates using a default antenna polarization pattern; and
 determining, in response to a threshold plurality of frames being transmitted, a PER of each of the different data transmission rates.

15. The method of claim 12, further comprising:
 determining a third packet error rate (PER) of a representative polarization pattern of the first polarization group using a training data transmission rate between the network device and the client device;
 selecting a data transmission rate having a lowest PER of different data transmission rates to be the training data transmission rate; and
 determining a PER of each of the respective representative antenna polarization patterns of the polarization groups using the training data transmission rate.

16. The network device of claim 1, wherein the first polarization group is associated with all horizontal antenna polarization patterns and the second polarization group is associated with all vertical antenna polarization patterns.

17. The network device of claim 1, wherein the first polarization group is associated with all cross-polarization patterns and the second polarization group is associated with either vertical antenna polarization patterns or horizontal antenna polarization patterns.

18. The network device of claim 1, wherein first packet error rate (PER) of the first data transmission rate for the first polarization group is measured over a predetermined interval of time.

19. The network device of claim 1, wherein first packet error rate (PER) of the first data transmission rate for the first polarization group is measured over a predetermined threshold of packets transferred to the client device.

20. The network device of claim 1, including instructions to cause the processing resource to:
 upon associating the antenna polarization pattern from the second polarization group with the client device, determine an acknowledgment (ACK) received signal strength indicator (RSSI) of the antenna polarization pattern; and
 refrain from determining a second ACK RSSI for a second antenna polarization pattern from the first polarization group.

* * * * *